(12) United States Patent
Huang et al.

(10) Patent No.: US 11,096,178 B2
(45) Date of Patent: Aug. 17, 2021

(54) USER EQUIPMENT CAPABILITY SIGNALING FOR CONCURRENT CHANNEL TRANSMISSIONS

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US); Gokul Sridharan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/532,935

(22) Filed: Aug. 6, 2019

(65) Prior Publication Data

US 2020/0053718 A1 Feb. 13, 2020

Related U.S. Application Data

(60) Provisional application No. 62/717,529, filed on Aug. 10, 2018.

(51) Int. Cl.
*H04W 72/04* (2009.01)
*H04W 72/10* (2009.01)
*H04W 8/24* (2009.01)

(52) U.S. Cl.
CPC ........... *H04W 72/048* (2013.01); *H04W 8/24* (2013.01); *H04W 72/10* (2013.01)

(58) Field of Classification Search
CPC ...... H04W 72/048; H04W 72/10; H04W 8/24
See application file for complete search history.

(56) References Cited

U.S. PATENT DOCUMENTS

| 2018/0076872 A1 | 3/2018 | Li et al. |
| 2020/0120691 A1* | 4/2020 | Siomina ................. H04L 27/26 |
| 2020/0236673 A1* | 7/2020 | Xu ......................... H04L 1/0031 |

FOREIGN PATENT DOCUMENTS

| CN | 3 331 295 A1 * | 9/2016 | ............ H04W 72/04 |
| EP | 3331295 A1 | 6/2018 | |

OTHER PUBLICATIONS

International Search Report and Written Opinion—PCT/US2019/045537—ISA/EPO—dated Oct. 28, 2019.

* cited by examiner

*Primary Examiner* — Yemane Mesfin
*Assistant Examiner* — Henry Baron
(74) *Attorney, Agent, or Firm* — Holland & Hart LLP

(57) ABSTRACT

Methods, systems, and devices for wireless communications are described. A user equipment (UE) may identify a capability of the UE to support concurrent transmissions on a maximum number of channels, and may report the capability to a base station. The UE may identify that the UE 115 is scheduled to concurrently transmit on a scheduled number of channels. In some cases, the scheduled number of channels may exceed the maximum number of channels supported for concurrent transmissions by the UE. In some cases, the UE may then transmit one or more concurrent transmissions to the base station, the one or more concurrent transmissions being less than or equal to the maximum number of channels supported for concurrent transmission by the UE.

30 Claims, 14 Drawing Sheets

USER EQUIPMENT CAPABILITY SIGNALING FOR CONCURRENT CHANNEL TRANSMISSIONS

CROSS REFERENCE

The present Application for Patent claims the benefit of U.S. Provisional Patent Application No. 62/717,529 by HUANG, et al., entitled "USER EQUIPMENT CAPABILITY SIGNALING FOR CONCURRENT CHANNEL TRANSMISSIONS," filed Aug. 10, 2018, assigned to the assignee hereof, and expressly incorporated by reference herein.

BACKGROUND

The following relates generally to wireless communications, and more specifically to user equipment (UE) capability signaling for concurrent channel transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency-division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as UE.

In some wireless communications systems, wireless devices may be capable of simultaneously transmitting messages using different spatial or frequency resources. In some cases, a UE may be limited in the number of uplink transmissions which the UE may transmit simultaneously. Nevertheless, in some instances, a base station may schedule the UE to transmit more uplink transmissions than the capability of the UE. Thus, solutions for handling the over-scheduled transmissions may be desirable.

SUMMARY

The described techniques relate to improved methods, systems, devices, and apparatuses that support user equipment (UE) capability signaling for concurrent channel transmissions. Generally, the described techniques provide for wireless communications systems supporting concurrent uplink channel transmissions.

A UE may determine a capability to support concurrent transmissions on a maximum number of channels. The UE may report the capability to the base station. In some cases, the base station may schedule concurrent transmission by the UE on a scheduled number of channels. In some cases, the scheduled number of channels may exceed the maximum number of channels supported for concurrent transmission by the UE. For example, a base station may allocate a set of resources to uplink transmissions. That is, a base station may schedule overlapping transmissions on multiple channels. Once the UE receives the scheduled number of channels, the UE may group the scheduled number of channels into a number of groups that is less than or equal to the maximum number of channels supported for concurrent transmission by the UE. In some cases, the UE may determine a priority level associated with each scheduled channel prior to grouping. In some cases, the UE may determine the priority level based on a payload associated with each channel, a content of each channel, a service type of each channel, or a combination thereof. In some cases, channels with similar priority level may be grouped together. The UE may then select channels for transmission from each of the groups, and may concurrently transmit the selected channels such that one transmission per group is used for the concurrent transmission.

A method of wireless communication at a UE is described. The method may include identifying a capability of the UE to support concurrent transmissions on a maximum number of channels, identifying that the UE is scheduled to concurrently transmit on a scheduled number of channels, the scheduled number of channels exceeding the maximum number of channels supported for concurrent transmissions by the UE, and transmitting one or more concurrent transmissions to a base station, the one or more concurrent transmissions being less than or equal to the maximum number of channels supported for concurrent transmission by the UE.

An apparatus for wireless communication at a UE is described. The apparatus may include a processor, memory coupled with the processor, and instructions stored in the memory. The instructions may be executable by the processor to cause the apparatus to identify a capability of the UE to support concurrent transmissions on a maximum number of channels, identify that the UE is scheduled to concurrently transmit on a scheduled number of channels, the scheduled number of channels exceeding the maximum number of channels supported for concurrent transmissions by the UE, and transmit one or more concurrent transmissions to a base station, the one or more concurrent transmissions being less than or equal to the maximum number of channels supported for concurrent transmission by the UE.

Another apparatus for wireless communication at a UE is described. The apparatus may include means for identifying a capability of the UE to support concurrent transmissions on a maximum number of channels, identifying that the UE is scheduled to concurrently transmit on a scheduled number of channels, the scheduled number of channels exceeding the maximum number of channels supported for concurrent transmissions by the UE, and transmitting one or more concurrent transmissions to a base station, the one or more concurrent transmissions being less than or equal to the maximum number of channels supported for concurrent transmission by the UE.

A non-transitory computer-readable medium storing code for wireless communication at a UE is described. The code may include instructions executable by a processor to identify a capability of the UE to support concurrent transmissions on a maximum number of channels, identify that the UE is scheduled to concurrently transmit on a scheduled number of channels, the scheduled number of channels exceeding the maximum number of channels supported for concurrent transmissions by the UE, and transmit one or more concurrent transmissions to a base station, the one or more concurrent transmissions being less than or equal to the maximum number of channels supported for concurrent transmission by the UE.

Some examples of the method, apparatuses, and non-transitory computer-readable medium described herein may further include operations, features, means, or instructions for grouping the scheduled number of channels into a number of groups that may be less than or equal to the maximum number of channels supported for concurrent transmission by the UE.

In some examples of the method, apparatuses, and non-transitory computer-readable medium described herein, transmitting the one or more concurrent transmissions may include operations, features, means, or instructions for selecting channels for transmission from each of the groups and concurrently transmitting the selected channels such that one transmission per group may be used for the concurrent transmission.

In some examples of the method, apparatuses, and non-transitory computer-readable medium described herein, grouping the scheduled number of channels into the number of groups may include operations, features, means, or instructions for grouping the scheduled number of channels into groups based on a priority level associated with each channel in the scheduled number of channels.

Some examples of the method, apparatuses, and non-transitory computer-readable medium described herein may further include operations, features, means, or instructions for determining the priority level associated with each channel based on a payload associated with each channel, a content of each channel, a service type of each channel, or a combination thereof.

Some examples of the method, apparatuses, and non-transitory computer-readable medium described herein may further include operations, features, means, or instructions for determining the priority level associated with each channel based on the channels being associated with either an ultra-reliable low-latency communications (URLLC) service or an enhanced mobile broadband (eMBB) service.

In some examples of the method, apparatuses, and non-transitory computer-readable medium described herein, grouping the scheduled number of channels into the number of groups may include operations, features, means, or instructions for grouping the scheduled number of channels into groups based on a priority level associated with each channel in the scheduled number of channels and dropping groups of lower priority so that the number of groups may be less than or equal to the maximum number of channels supported for concurrent transmissions by the UE.

In some examples of the method, apparatuses, and non-transitory computer-readable medium described herein, each group includes one of the scheduled number of channels. In some examples of the method, apparatuses, and non-transitory computer-readable medium described herein, transmitting the one or more concurrent transmissions may include operations, features, means, or instructions for multiplexing one or more of the selected channels within each group and transmitting the one or more transmissions on respective multiplexed channels for each group. In some examples of the method, apparatuses, and non-transitory computer-readable medium described herein, transmitting the one or more concurrent transmissions may include operations, features, means, or instructions for, transmitting the one or more concurrent transmissions using one or more antennas.

Some examples of the method, apparatuses, and non-transitory computer-readable medium described herein may further include operations, features, means, or instructions for determining a highest priority channel within each group and selecting channels for transmission from each of the groups, where the selected channels may be the highest priority channels.

Some examples of the method, apparatuses, and non-transitory computer-readable medium described herein may further include operations, features, means, or instructions for reporting, to the base station, the capability of the UE to support concurrent transmissions on the maximum number of channels.

A method of wireless communication at a base station is described. The method may include receiving information from a UE identifying a capability of the UE to support concurrent transmissions on a maximum number of channels, scheduling concurrent transmission by the UE on a scheduled number of channels, the scheduled number of channels exceeding the maximum number of channels supported for concurrent transmission by the UE, and receiving, in response to the scheduling, one or more concurrent transmissions from the UE, the one or more concurrent transmissions being less than or equal to the maximum number of channels supported for concurrent transmission by the UE.

An apparatus for wireless communication at a base station is described. The apparatus may include a processor, memory coupled with the processor, and instructions stored in the memory. The instructions may be executable by the processor to cause the apparatus to receive information from a UE identifying a capability of the UE to support concurrent transmissions on a maximum number of channels, schedule concurrent transmission by the UE on a scheduled number of channels, the scheduled number of channels exceeding the maximum number of channels supported for concurrent transmission by the UE, and receive, in response to the scheduling, one or more concurrent transmissions from the UE, the one or more concurrent transmissions being less than or equal to the maximum number of channels supported for concurrent transmission by the UE.

Another apparatus for wireless communication at a base station is described. The apparatus may include means for receiving information from a UE identifying a capability of the UE to support concurrent transmissions on a maximum number of channels, scheduling concurrent transmission by the UE on a scheduled number of channels, the scheduled number of channels exceeding the maximum number of channels supported for concurrent transmission by the UE, and receiving, in response to the scheduling, one or more concurrent transmissions from the UE, the one or more concurrent transmissions being less than or equal to the maximum number of channels supported for concurrent transmission by the UE.

A non-transitory computer-readable medium storing code for wireless communication at a base station is described. The code may include instructions executable by a processor to receive information from a UE identifying a capability of the UE to support concurrent transmissions on a maximum number of channels, schedule concurrent transmission by the UE on a scheduled number of channels, the scheduled number of channels exceeding the maximum number of channels supported for concurrent transmission by the UE, and receive, in response to the scheduling, one or more concurrent transmissions from the UE, the one or more concurrent transmissions being less than or equal to the maximum number of channels supported for concurrent transmission by the UE.

In some examples of the method, apparatuses, and non-transitory computer-readable medium described herein, receiving, in response to the scheduling, one or more concurrent transmissions from the UE may include operations, features, means, or instructions for receiving one or more messages via one or more of the scheduled number of channels, the scheduled number of channels being grouped into groups based on a priority level associated with each channel in the scheduled number of channels.

In some examples of the method, apparatuses, and non-transitory computer-readable medium described herein, the priority level associated with each channel based on a payload associated with each channel, a content of each channel, a service type of each channel, or a combination thereof.

In some examples of the method, apparatuses, and non-transitory computer-readable medium described herein, the priority level associated with each channel based on the channels being associated with either a URLLC service or an eMBB service. In some examples of the method, apparatuses, and non-transitory computer-readable medium described herein, each group includes one of the scheduled number of channels.

DETAILED DESCRIPTION

Figure 1:
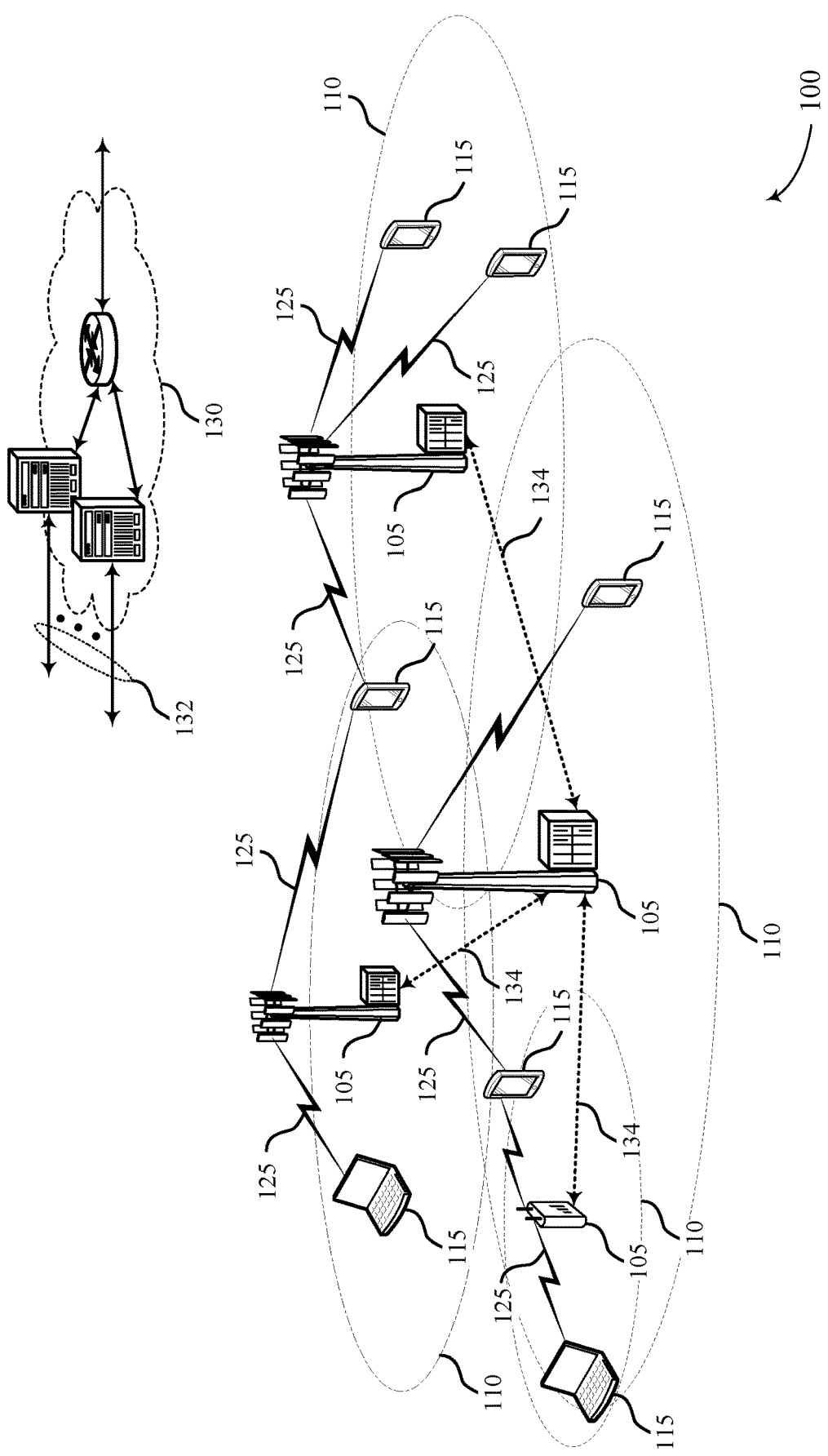
FIG. 1 illustrates an example of a system for wireless communications that supports user equipment (UE) capability signaling for concurrent channel transmissions in accordance with aspects of the present disclosure.

Some wireless communications systems may schedule communication resources to support both uplink and downlink transmissions. For example, a wireless communications system may allocate a set of resources to uplink transmissions. In one example, a base station may schedule overlapping transmissions on multiple channels, supported by the use of multiple antennas at a single device. A user equipment (UE) may be equipped with multiple antennas and/or transmit chains. Such devices may thus be capable of simultaneously transmitting multiple data streams to another device (e.g., a base station) using a same set of time/frequency resources. As an example, the UE may send simultaneous transmissions (e.g., concurrent transmissions) using multiple antennas/transmit chains. These uplink channels may include a physical uplink shared channel (PUSCH), a physical uplink control channel (PUCCH), a sounding reference signal (SRS), a physical random access channel (PRACH), etc.

In some cases, the UE may determine a capability to support concurrent transmissions on a maximum number of channels. Upon determining the capability, the UE may report the capability to the base station. The base station may schedule concurrent transmission by the UE on a scheduled number of channels. In some cases, the scheduled number of channels may exceed the maximum number of channels supported for concurrent transmission by the UE. Once the UE receives the scheduled number of channels, the UE may group the scheduled number of channels into a number of groups that is less than or equal to the maximum number of channels supported for concurrent transmission by the UE. In some cases, the UE may determine a priority level associated with each scheduled channel prior to grouping. In some cases, the UE may determine the priority level based on a payload associated with each channel, a content of each channel, a service type of each channel, or a combination thereof. In some cases, channels with similar priority level may be grouped together. In some cases, the UE may either multiplex or drop channels within each group, such that each group transmits one channel. In some cases, the UE may determine whether a total number of groups exceeds the maximum number of channels supported for concurrent transmission by the UE. If the total number of groups exceeds the maximum number of channels, the UE may drop groups of lower priority so that the number of groups is less than or equal to the maximum number of channels supported for concurrent transmissions by the UE. In some cases, the UE may then select channels for transmission from each of the groups, and may concurrently transmit the selected channels such that one transmission per group is used for the concurrent transmission.

Aspects of the disclosure are initially described in the context of a wireless communications system. Aspects of the disclosure are further illustrated by and described with reference to apparatus diagrams, system diagrams, and flowcharts that relate to UE capability signaling for concurrent channel transmissions.

FIG. 1 illustrates an example of a wireless communications system 100 that supports UE capability signaling for concurrent channel transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may be referred to as a mobile device, a wireless device, a remote device, a handheld device, or a subscriber device, or some other suitable terminology, where the "device" may be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, for example in the range of 300 MHz to 300 GHz. For instance, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may additionally or alternatively operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may additionally or alternatively operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), unlicensed radio frequency spectrum band (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may additionally or alternatively use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Additionally or alternatively, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-S-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may include dedicated acquisition signaling (e.g., synchronization signals or system information, etc.) and control signaling that coordinates operation for the carrier. In some examples (e.g., in a carrier aggregation configuration), a carrier may additionally or alternatively have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers (CCs0 and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may additionally or alternatively be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

According to one or more aspects of the disclosure, the UE 115 may identify a capability of the UE 115 to support concurrent transmissions on a maximum number of channels and may report the capability to a base station 105. The UE 115 may identify that the UE 115 is scheduled to concurrently transmit on a scheduled number of channels. In some cases, the scheduled number of channels may exceed the maximum number of channels supported for concurrent transmissions by the UE 115. In some cases, the UE 115 may group the scheduled number of channels into a number of groups that is less than or equal to the maximum number of channels supported for concurrent transmission by the UE 115, and may select channels for transmission from each of the groups. The UE 115 may then concurrently transmit the selected channels such that one transmission per group is used for the concurrent transmission.

According to one or more aspects of the disclosure, the base station 105 may receive information from UE 115 identifying a capability of the UE 115 to support concurrent transmissions on a maximum number of channels. The base station 105 may then schedule concurrent transmission by the UE 115 on a scheduled number of channels. In some cases, the scheduled number of channels may exceed the maximum number of channels supported for concurrent transmission by the UE 115. Additionally, the base station 105 may receive, in response to the scheduling, one or more concurrent transmissions from the UE 115. In some cases, the one or more concurrent transmissions may be less than or equal to the maximum number of channels supported for concurrent transmission by the UE 115.

Figure 2:
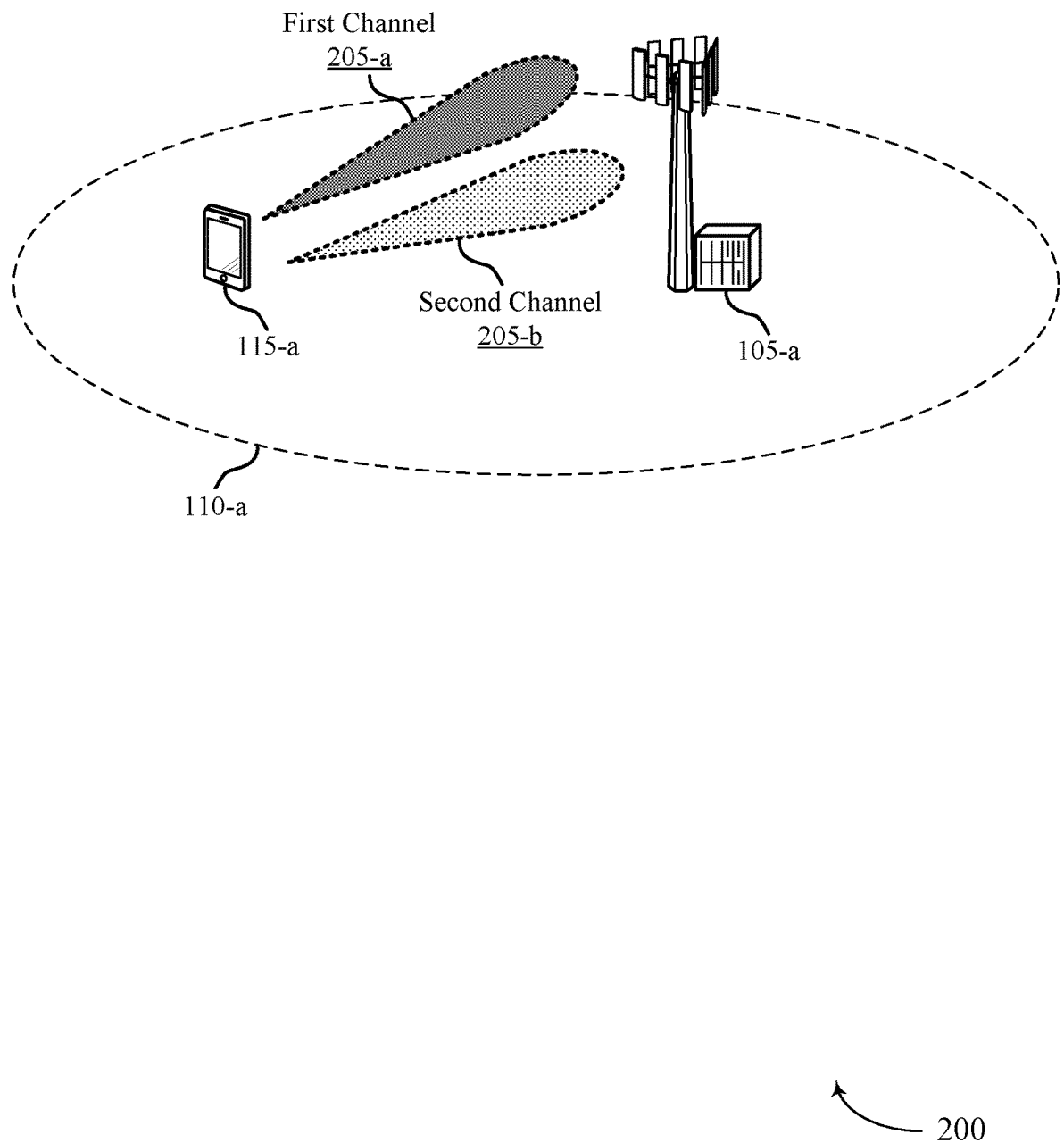
FIG. 2 illustrates an example of a system for wireless communications that supports UE capability signaling for concurrent channel transmissions in accordance with aspects of the present disclosure.

FIG. 2 illustrates an example of a wireless communications system 200 that supports UE capability signaling for concurrent channel transmissions in accordance with various aspects of the present disclosure. In some examples, wireless communications system 200 may implement aspects of wireless communications system 100. For example, wireless communications system 200 may include a base station 105-a and a UE 115-a, which may be examples of the corresponding devices described with reference to FIG. 1. Wireless communications system may illustrate an example of a system that supports the simultaneous transmission of multiple uplink channels based on a UE capability signaling.

Some existing systems do not allow a UE to simultaneously transmit multiple channels on a same component carrier (CC). In some cases, the existing systems do not allow transmission of two different uplink channels or two uplink signals on the same OFDM symbol on the same CC. Since simultaneous transmission is not allowed, some existing systems allow for piggybacking a first channel on the resources of a second channel. In some examples, PUCCH may be transmitted as piggybacked on the resources of PUSCH. In another case, a first channel may be assigned a higher priority than a second channel, and the lower priority channel may be dropped during simultaneous transmissions. For example, in case of simultaneous transmissions of SRS and PUCCH, the UE may be configured to drop the SRS and transmit PUCCH. In some existing systems, uplink transmissions of two different channels or signals using one antenna may create radio frequency implementation challenges.

According to various aspects of the present disclosure, UE 115-a may be capable of simultaneous uplink transmissions using multiple antennas and/or transmit chains. For example, UE 115-a may be equipped with various sets of antennas and/or radio chains that may simultaneously process multiple data streams for transmission to base station 105-a. UE 115-a may thus be capable of sending simultaneous transmissions of different uplink channels (e.g., uplink transmissions including PUSCH, PUCCH, SRS, etc.) using the respective antennas/transmit chains. In some cases, based on a UE capability, these uplink channels may be multiplexed on the same set of time and frequency resources within one CC.

In some cases, wireless communications systems may schedule communication resources to support both uplink and downlink transmissions. For example, a wireless communications system may allocate a set of resources to uplink transmissions based on resource allocation from the base station 105-a. In one example, a base station 105-a may schedule overlapping transmissions on multiple channels. The UE 115-a may determine a capability of the UE 115-a to support concurrent transmissions on a maximum number of channels. For example, the UE 115-a may determine that it is capable of supporting concurrent transmissions on "X" channels. Upon determining the capability, the UE 115-a may transmit the capability information to base station 105-a. In one example, a capability of "X=1" may indicate that the UE 115-a does not have the capability to support uplink simultaneous transmission on the same CC. Alternatively, a capability of "X>1" may indicate that the UE 115-a has a capability to support uplink simultaneous transmission on the same CC. For example, a capability of "X=3" may indicate that the UE 115-a may support 3 concurrent transmissions on the same CC. In some cases, a capability of the UE 115-a may be based on the UE 115-a being a low-end UE or a high-end UE.

Once the UE 115-a transmits the capability information to the base station 105-a, the base station 105-a may schedule concurrent transmission for the UE 115-a on a scheduled number of channels. In some cases, the scheduled number of channels may exceed the maximum number of channels supported for concurrent transmission by the UE. For example, the base station 105-a may schedule concurrent transmissions on "Y" number of channels. In some cases, "Y" may be greater than "X." In some cases, the base station 105-a may schedule concurrent transmissions on "Y" number of channels, where "Y" is less than or equal to "X." In a case where "X" is greater than 1, and the base station schedules "Y" channels simultaneously on one OFDM symbol, the UE 115-a may transmit the channels simultaneously if "Y" is less than "X."

Alternatively, the UE 115-a may determine that "X" is greater than 1, and the base station has scheduled "Y" channels simultaneously on one OFDM symbol, where "Y" is greater than "X." In such a case, the UE 115-a may group the scheduled number of channels (i.e., "Y" channels) into a number of groups that is less than or equal to the maximum number of channels supported for concurrent transmission by the UE (i.e., "X" channels). In one example, the UE 115-a may group the "Y" channels into "Z" number of groups. In some cases, the UE 115-a may group the "Y" channels based on a priority level for each channel. That is, the UE 115-a may determine a priority level associated with each channel scheduled for transmission by the base station 105-a. In some cases, the UE 115-a may determine the priority level based on a payload associated with each channel, a content of each channel, a service type of each channel, or a combination thereof. For example, one or more channels associated with same service type may be grouped in one group. In some examples, the UE 115-a may determine the priority level associated with each channel based on the channels being associated with either an ultra-reliable low-latency communications (URLLC) service or an eMBB service. In such an example, the channels associated with URLLC service may be grouped into a first group and the channels associated with eMBB service may be grouped into a second group. the UE 115-a may then select channels for transmission from each of the groups. In some cases, the UE 115-a may concurrently transmit the selected channels such that one transmission per group is used for the concurrent transmission.

According to one or more aspects of the present disclosure, the UE 115-a may determine whether the number of groups (i.e., "Z" groups) are greater than the maximum number of channels supported for concurrent transmission by the UE. For example, the UE 115-a may determine whether "Z" is greater than "X." In cases, where "Z" is less than or equal to "X," the UE 115-a may either multiplex or drop channels within each group, such that each group transmits one channel. The UE 115-a may support multiplexing of various uplink transmissions in the spatial domain. For example, simultaneous uplink channels that are spatially multiplexed on a set of resources may be sent via multiple transmit chains/antennas in the same CC. In some cases, the UE 115-a may drop lower priority channels within each group and may transmit one channel per group.

Alternatively, the UE 115-a may determine that the number of groups (i.e., "Z" groups) is greater than the maximum number of channels supported for concurrent transmission by the UE. For example, the UE 115-a may determine that "Z" is greater than "X." In cases, where "Z" is greater than "X," the UE 115-a may drop groups of lower priority so that the remaining number of groups is less than or equal to "X." More specifically, the UE 115-a may group the scheduled number of channels into "Z" groups based on a priority level associated with each channel in the scheduled number of channels. The UE 115-a may drop groups of lower priority so that the number of groups is less than or equal to the maximum number of channels supported for concurrent transmissions by the UE (i.e., "X" groups). Within the remaining number of groups, the UE 115-a may either multiplex or drop channels within each group, such that each group transmits one channel. By way of example, the UE 115-a may determine a highest priority channel within each group, and may select channels for transmission from each of the groups, such that the selected channels are the highest priority channels.

In some cases, one group may include a maximum of one channel. The UE 115-a may determine that the maximum number of channels supported for concurrent transmission by the UE (i.e., "X") is greater than 1, and the base station has scheduled "Y" channels simultaneously on one OFDM symbol, where "Y" is greater than "X.". The UE 115-a may determine a highest priority channel among the total number of channels scheduled by the base station 105-a (i.e., "Y" channels), without grouping the channels. The UE 115-a may then select channels for transmission, such that the selected channels are the highest priority channels.

Figure 3:
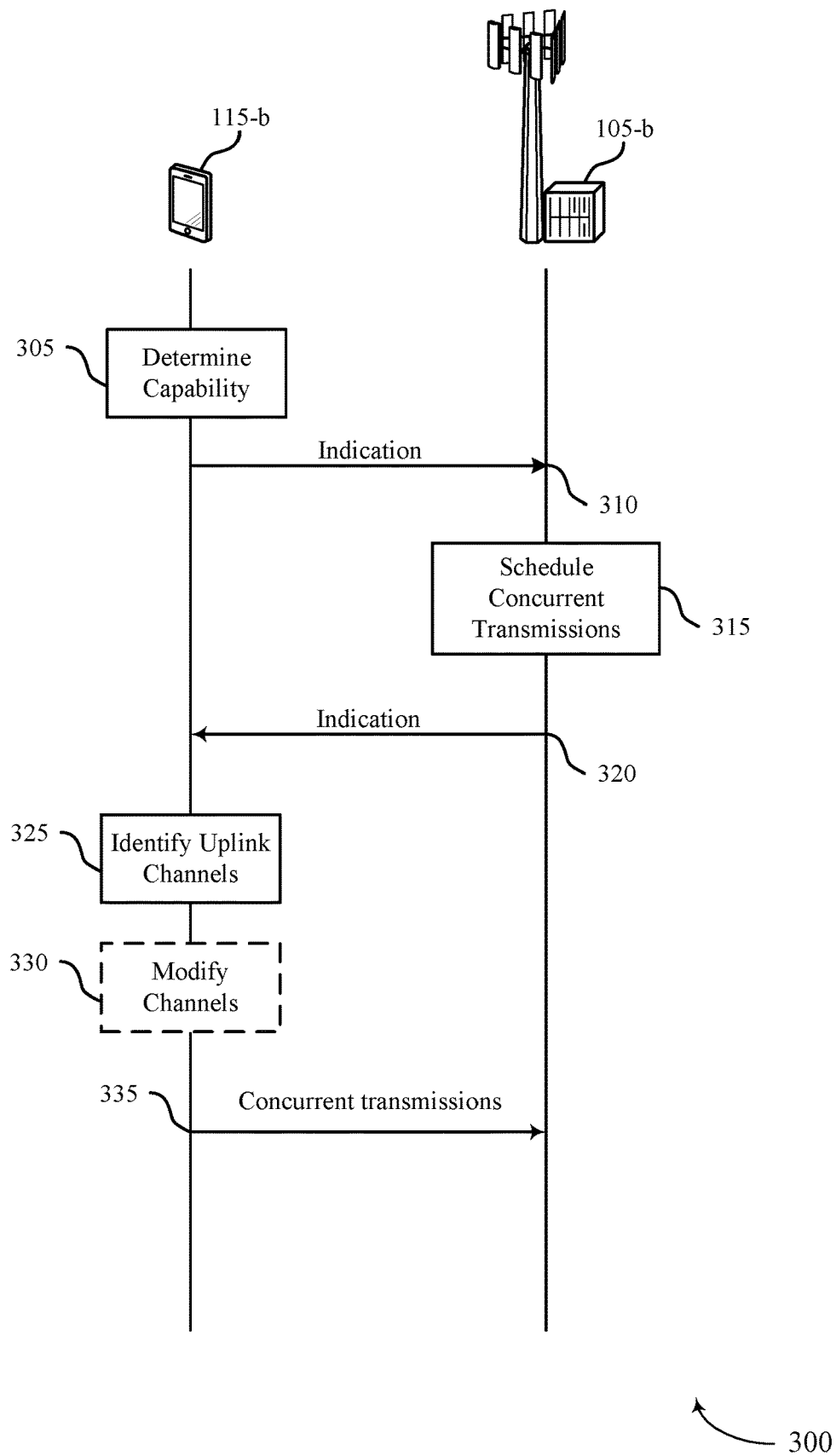
FIG. 3 illustrates an example of a process flow that supports UE capability signaling for concurrent channel transmissions in accordance with aspects of the present disclosure.

FIG. 3 illustrates an example of a process flow 300 that supports UE capability signaling for concurrent channel transmissions in accordance with aspects of the present disclosure. In some examples, process flow 300 may implement aspects of wireless communications system 100. For example, process flow 300 may include a UE 115-b and one base station 105-b, which may be examples of the corresponding devices described with reference to FIGS. 1-2.

In the following description of the process flow 300, the operations between the base station 105-b, and the UE 115-b may be transmitted in a different order than the exemplary order shown, or the operations performed by the base station 105-b, and the UE 115-b may be performed in different orders or at different times. Some operations may be left out of the process flow 300, or other operations may be added to the process flow 300.

At 305, UE 115-b may determine a capability of the UE 115-b to support concurrent transmissions on a maximum number of channels. For example, the UE 115-a may determine that it is capable of supporting concurrent transmissions on "X" channels. At 310, UE 115-b may report the capability of the UE 115-b to support concurrent transmissions to base station 105-b.

At 315, base station 105-b may schedule concurrent transmission by the UE 115-b on a scheduled number of channels. In some cases, the scheduled number of channels may exceed the maximum number of channels supported for concurrent transmission by the UE 115-b. For example, the base station 105-b may receive an indication that UE 115-b is capable of supporting simultaneous transmission on "X" channels. The base station 105-b may schedule concurrent transmissions on "Y" channels, where "Y>X."

At 320, base station 105-b indicate the scheduled channels to UE 115-b. At 325, UE 115-b may identify, from the scheduled channels ("Y" channels), the uplink channels for transmission on a CC. In some cases, the uplink channels may be of different types. For example, the uplink channels may include PUCCH, PUSCH, PRACH, SRS, or a combination thereof.

At 330, UE 115-b may optionally modify the scheduled number of channels for transmission to the base station 105-b. In some cases, the UE 115-b may group the scheduled number of channels into a number of groups that is less than or equal to the maximum number of channels supported for concurrent transmission by the UE. For example, the UE 115-b may group the "Y" channels into "Z" groups. In some cases, each group may include one channel.

In some cases, the UE 115-b may group the scheduled number of channels into groups based on a priority level associated with each channel in the scheduled number of channels. In some cases, the UE 115-b may determine the priority level associated with each channel based on a payload associated with each channel, a content of each channel, a service type of each channel, or a combination thereof. The UE 115-b may additionally or alternatively determine whether the number of groups exceeds the maximum number of channels supported for concurrent transmission by the UE 115-b. For example, the UE 115-b may determine whether "Z" is greater than "X." In response to determining that the number of groups exceeds the maximum number of channels supported for concurrent transmission by the UE 115-b, the UE 115-b may drop groups of lower priority so that the number of groups is less than or equal to the maximum number of channels supported.

At 335, UE 115-b may transmit one or more concurrent transmissions to base station 105-b. In some examples, UE 115-b may transmit the one or more concurrent transmissions using one or more antennas. In some cases, the one or more concurrent transmissions is less than or equal to the maximum number of channels supported for concurrent transmission by the UE 115-b.

Figure 4:
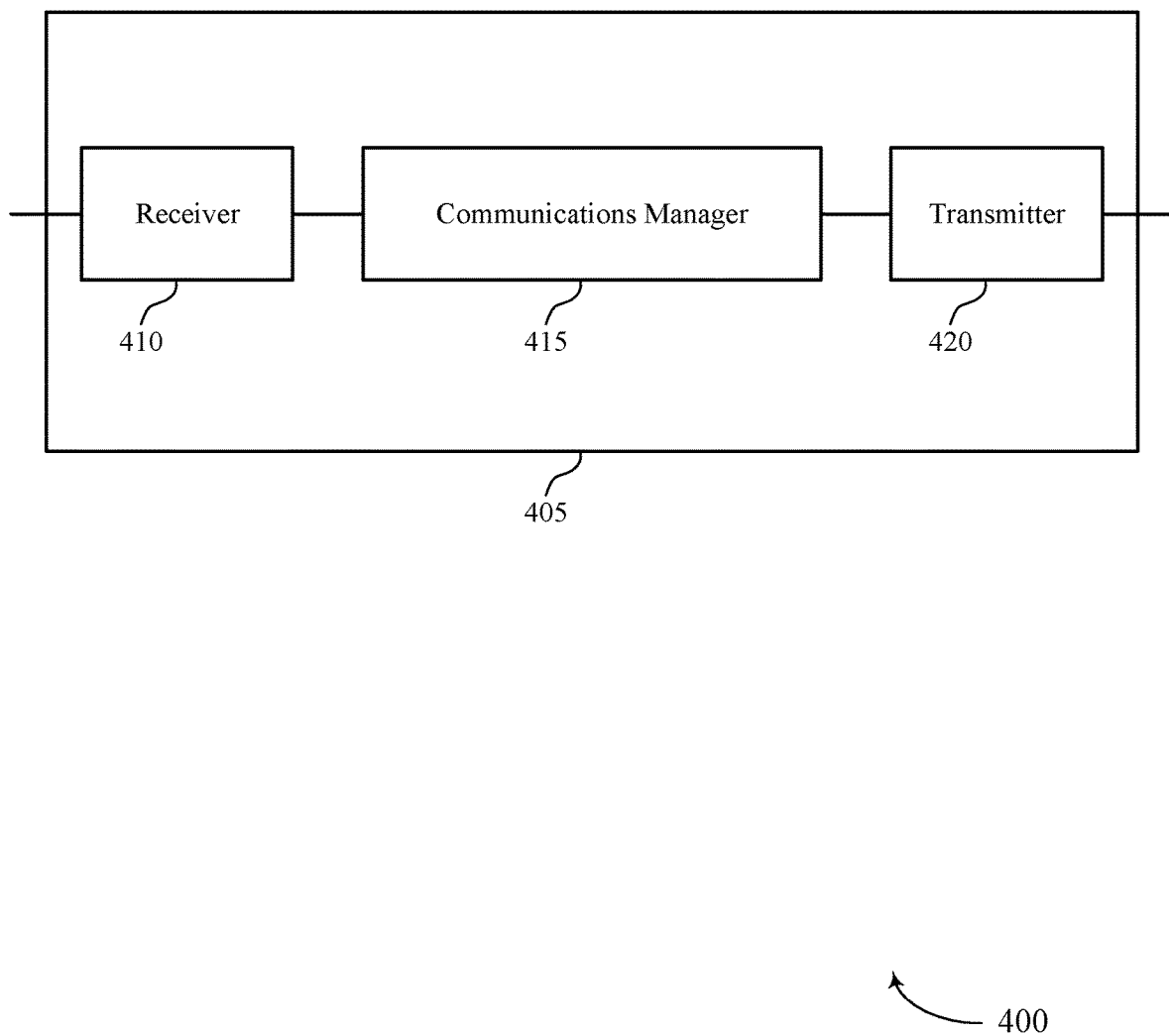
FIGS. 4 and 5 show block diagrams of devices that support UE capability signaling for concurrent channel transmissions in accordance with aspects of the present disclosure.

FIG. 4 shows a block diagram 400 of a device 405 that supports UE capability signaling for concurrent channel transmissions in accordance with aspects of the present disclosure. The device 405 may be an example of aspects of a UE 115 as described herein. The device 405 may include a receiver 410, a communications manager 415, and a transmitter 420. The device 405 may additionally or alternatively include a processor. Each of these components may be in communication with one another (e.g., via one or more buses).

The receiver 410 may receive information such as packets, user data, or control information associated with various information channels (e.g., control channels, data channels, and information related to UE capability signaling for concurrent channel transmissions, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a capability of the UE to support concurrent transmissions on a maximum number of channels, identify that the UE is scheduled to concurrently transmit on a scheduled number of channels, the scheduled number of channels exceeding the maximum number of channels supported for concurrent transmissions by the UE, and transmit one or more concurrent transmissions to a base station, the one or more concurrent transmissions being less than or equal to the maximum number of channels supported for concurrent transmission by the UE. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
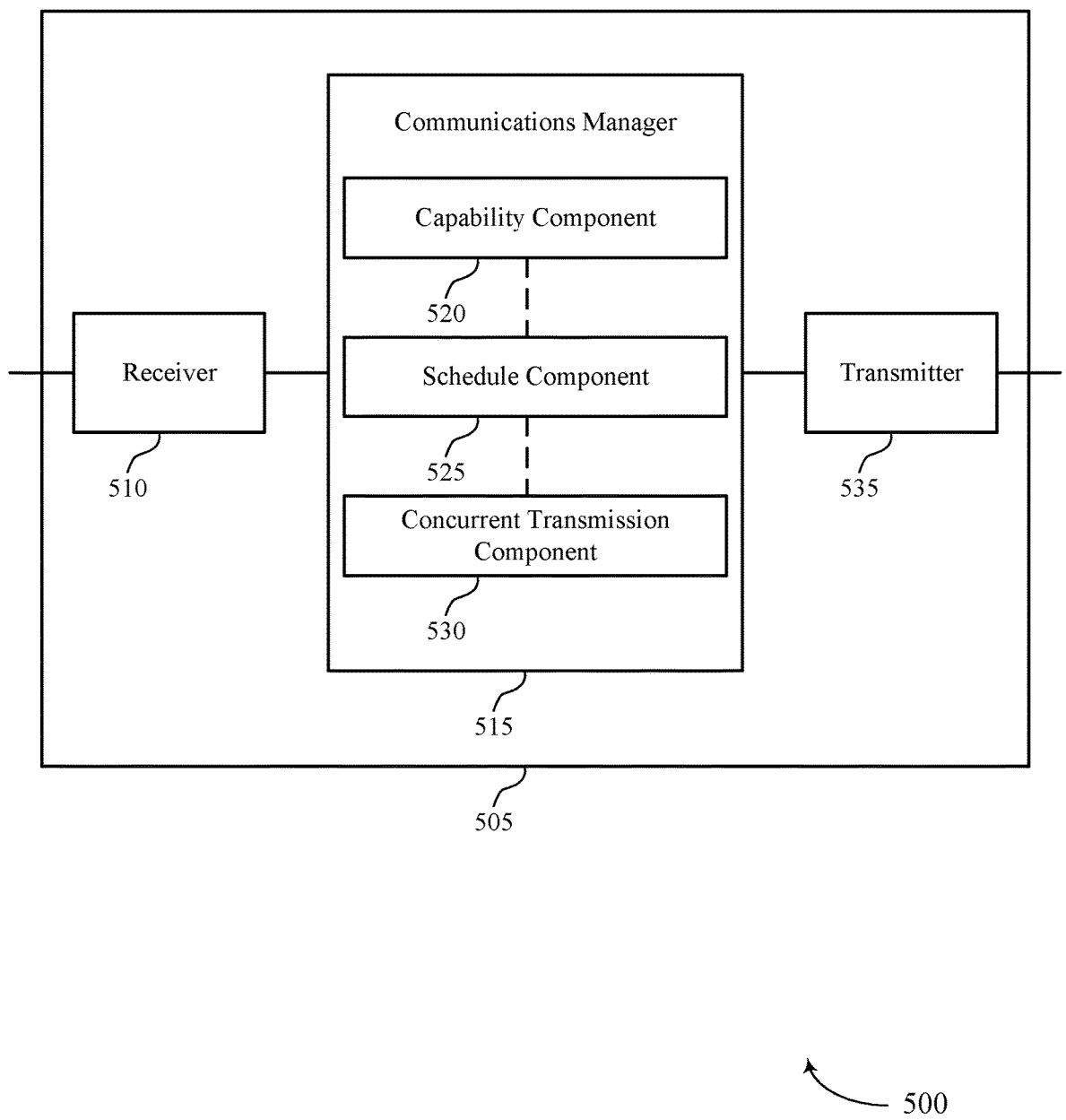

FIG. 5 shows a block diagram 500 of a device 505 that supports UE capability signaling for concurrent channel transmissions in accordance with aspects of the present disclosure. The device 505 may be an example of aspects of a device 405 or a UE 115 as described herein. The device 505 may include a receiver 510, a communications manager 515, and a transmitter 535. The device 505 may include a processor. Each of these components may be in communication with one another (e.g., via one or more buses).

The receiver 510 may receive information such as packets, user data, or control information associated with various information channels (e.g., control channels, data channels, and information related to UE capability signaling for concurrent channel transmissions, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a capability component 520, a schedule component 525, and a concurrent transmission component 530. The communications manager 515 may be an example of aspects of the communications manager 710 described herein.

The capability component 520 may identify a capability of the UE to support concurrent transmissions on a maximum number of channels. The schedule component 525 may identify that the UE is scheduled to concurrently transmit on a scheduled number of channels, the scheduled number of channels exceeding the maximum number of channels supported for concurrent transmissions by the UE. The concurrent transmission component 530 may transmit one or more concurrent transmissions to a base station, the one or more concurrent transmissions being less than or equal to the maximum number of channels supported for concurrent transmission by the UE. The concurrent transmission component 530 may transmit the one or more concurrent transmissions using one or more antennas.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
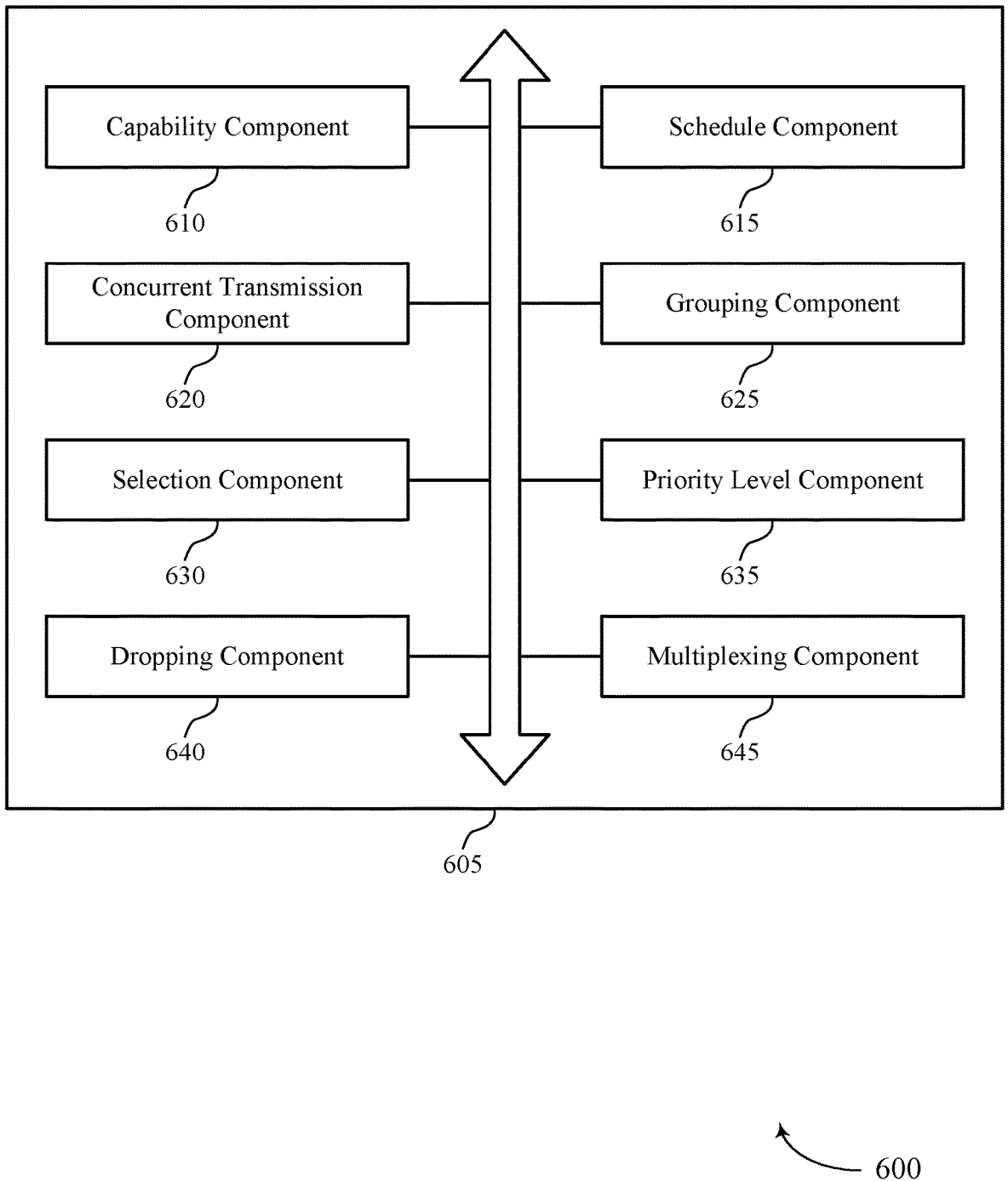
FIG. 6 shows a block diagram of a communications manager that supports UE capability signaling for concurrent channel transmissions in accordance with aspects of the present disclosure.

FIG. 6 shows a block diagram 600 of a communications manager 605 that supports UE capability signaling for concurrent channel transmissions in accordance with aspects of the present disclosure. The communications manager 605 may be an example of aspects of a communications manager 415, a communications manager 515, or a communications manager 710 described herein. The communications manager 605 may include a capability component 610, a schedule component 615, a concurrent transmission component 620, a grouping component 625, a selection component 630, a priority level component 635, a dropping component 640, and a multiplexing component 645. Each of these modules may communicate, directly or indirectly, with one another (e.g., via one or more buses).

The capability component 610 may identify a capability of the UE to support concurrent transmissions on a maximum number of channels. In some examples, the capability component 610 may report, to the base station, the capability of the UE to support concurrent transmissions on the maximum number of channels.

The schedule component 615 may identify that the UE is scheduled to concurrently transmit on a scheduled number of channels, the scheduled number of channels exceeding the maximum number of channels supported for concurrent transmissions by the UE.

The concurrent transmission component 620 may transmit one or more concurrent transmissions to a base station, the one or more concurrent transmissions being less than or equal to the maximum number of channels supported for concurrent transmission by the UE. In some examples, the concurrent transmission component 620 may transmit the one or more transmissions on respective multiplexed channels for each group. The concurrent transmission component 620 may transmit the one or more concurrent transmissions using one or more antennas.

The grouping component 625 may group the scheduled number of channels into a number of groups that is less than or equal to the maximum number of channels supported for concurrent transmission by the UE. In some examples, the grouping component 625 may group the scheduled number of channels into groups based on a priority level associated with each channel in the scheduled number of channels. In some examples, the grouping component 625 may group the scheduled number of channels into groups based on a priority level associated with each channel in the scheduled number of channels. In some cases, each group includes one of the scheduled number of channels.

The selection component 630 may select channels for transmission from each of the groups. In some examples, the selection component 630 may select channels for transmission from each of the groups, where the selected channels are the highest priority channels. The priority level component 635 may determine the priority level associated with each channel based on a payload associated with each channel, a content of each channel, a service type of each channel, or a combination thereof. In some examples, the priority level component 635 may determine the priority level associated with each channel based on the channels being associated with either a URLLC service or an eMBB service. In some examples, the priority level component 635 may determine a highest priority channel within each group. The dropping component 640 may drop groups of lower priority so that the number of groups is less than or equal to the maximum number of channels supported for concurrent transmissions by the UE. The multiplexing component 645 may multiplex one or more of the selected channels within each group.

Figure 7:
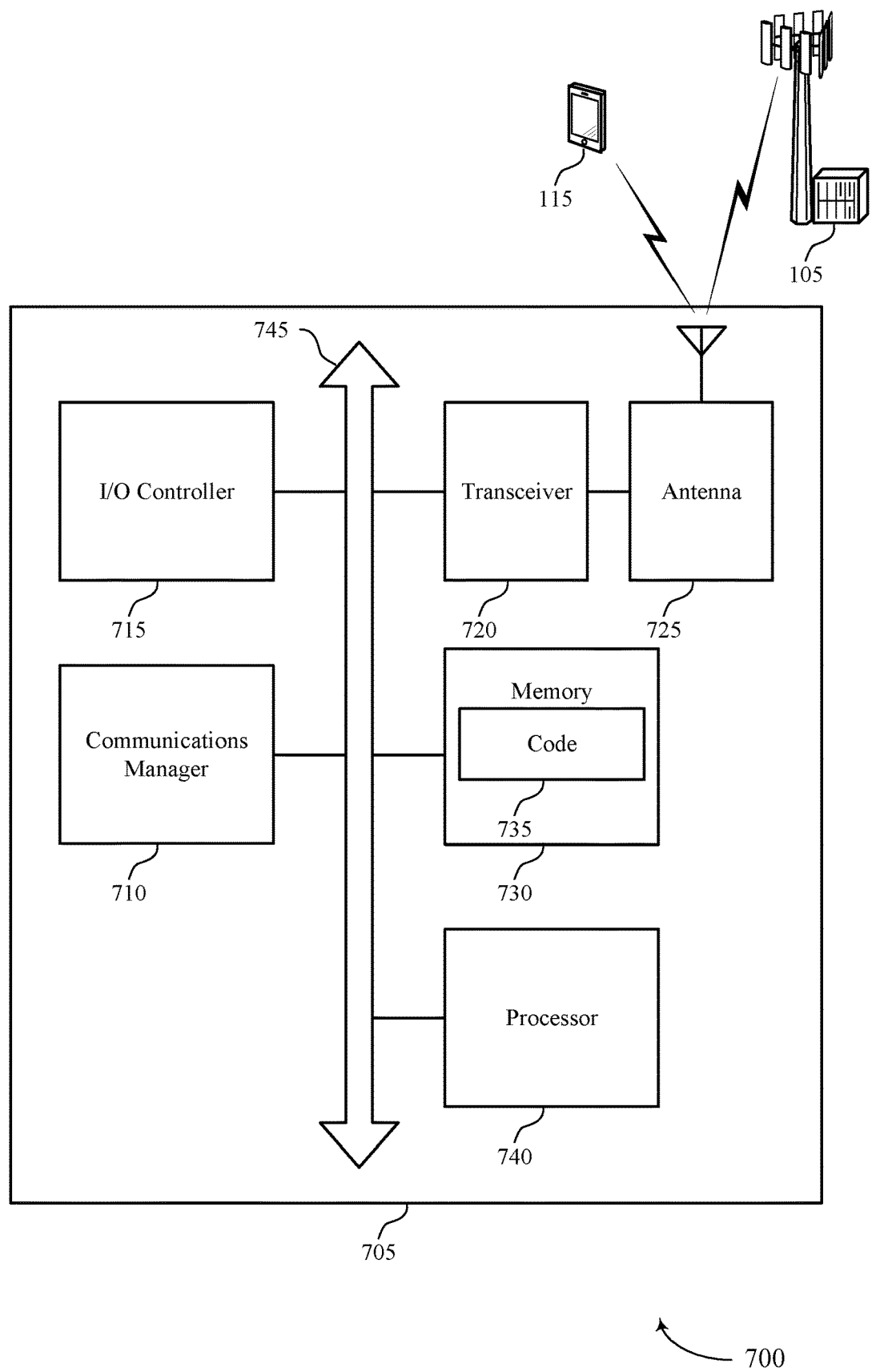
FIG. 7 shows a diagram of a system including a device that supports UE capability signaling for concurrent channel transmissions in accordance with aspects of the present disclosure.

FIG. 7 shows a diagram of a system 700 including a device 705 that supports UE capability signaling for concurrent channel transmissions in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a capability of the UE to support concurrent transmissions on a maximum number of channels, identify that the UE is scheduled to concurrently transmit on a scheduled number of channels, the scheduled number of channels exceeding the maximum number of channels supported for concurrent transmissions by the UE, and transmit one or more concurrent transmissions to a base station, the one or more concurrent transmissions being less than or equal to the maximum number of channels supported for concurrent transmission by the UE.

The I/O controller 715 may manage input and output signals for the device 705. The I/O controller 715 may manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may additionally or alternatively include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a Basic Input/Output System (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting UE capability signaling for concurrent channel transmissions).

The computer-executable code 735 may include instructions to implement aspects of the present disclosure, including instructions to support wireless communications. The computer-executable code 735 may be stored in a non-transitory computer-readable medium such as system memory or other type of memory. In some cases, the computer-executable code 735 may not be directly executable by the processor 740 but may cause a computer (e.g., when compiled and executed) to perform functions described herein.

Figure 8:
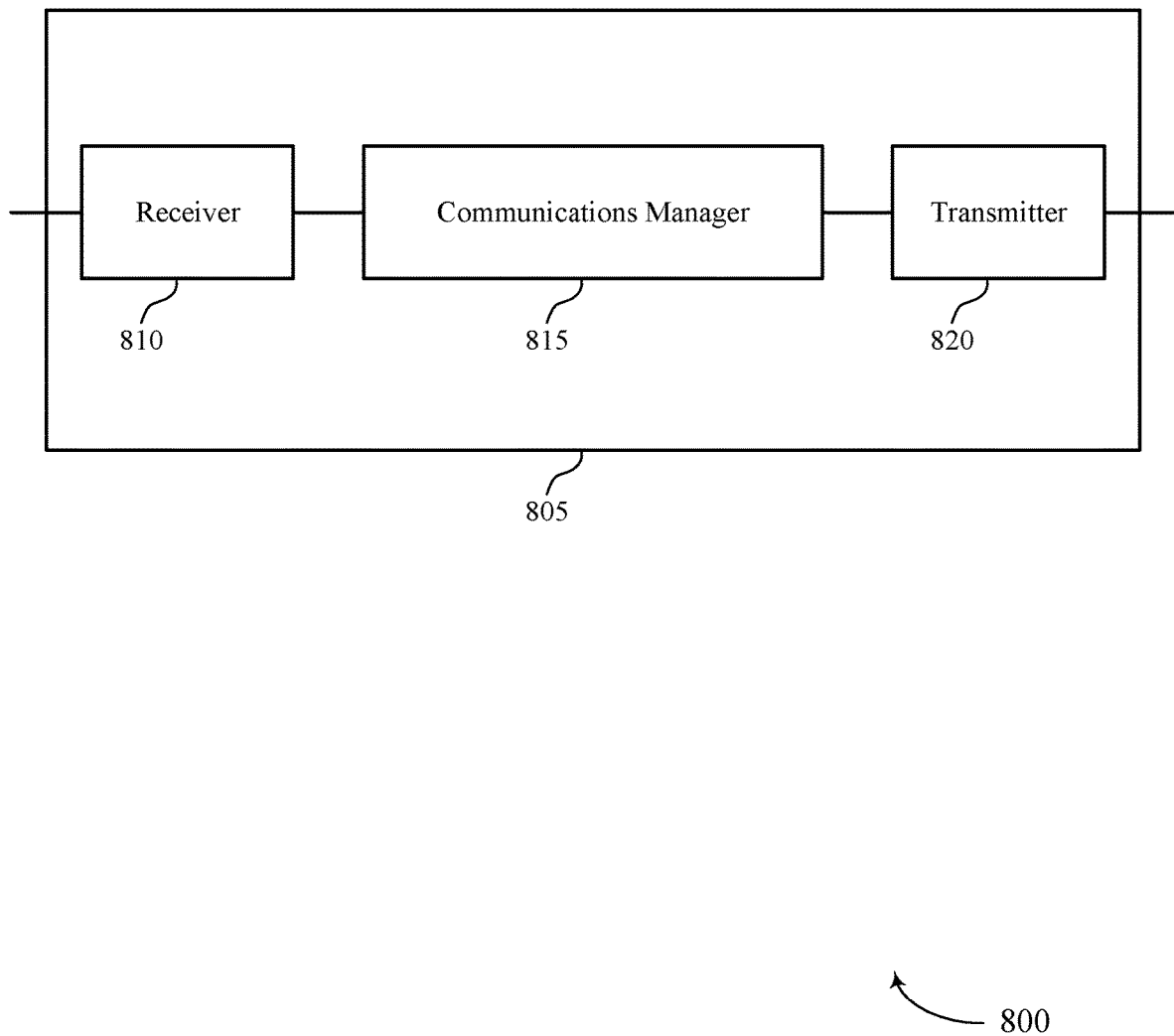
FIGS. 8 and 9 show block diagrams of devices that support UE capability signaling for concurrent channel transmissions in accordance with aspects of the present disclosure.

FIG. 8 shows a block diagram 800 of a device 805 that supports UE capability signaling for concurrent channel transmissions in accordance with aspects of the present disclosure. The device 805 may be an example of aspects of a base station 105 as described herein. The device 805 may include a receiver 810, a communications manager 815, and a transmitter 820. The device 805 may additionally or alternatively include a processor. Each of these components may be in communication with one another (e.g., via one or more buses).

The receiver 810 may receive information such as packets, user data, or control information associated with various information channels (e.g., control channels, data channels, and information related to UE capability signaling for concurrent channel transmissions, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive information from a UE identifying a capability of the UE to support concurrent transmissions on a maximum number of channels, schedule concurrent transmission by the UE on a scheduled number of channels, the scheduled number of channels exceeding the maximum number of channels supported for concurrent transmission by the UE, and receive, in response to the scheduling, one or more concurrent transmissions from the UE, the one or more concurrent transmissions being less than or equal to the maximum number of channels supported for concurrent transmission by the UE. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
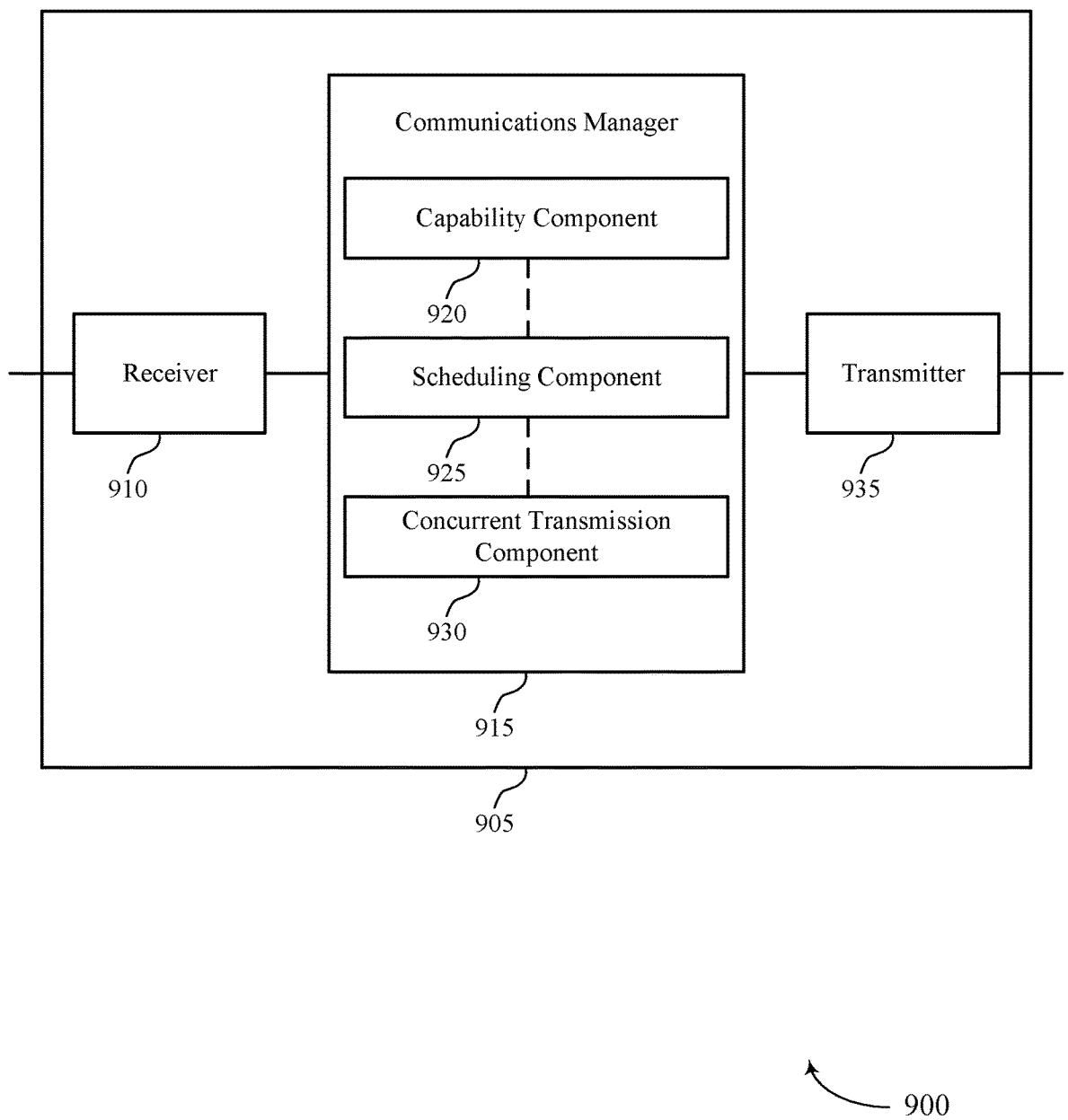

FIG. 9 shows a block diagram 900 of a device 905 that supports UE capability signaling for concurrent channel transmissions in accordance with aspects of the present disclosure. The device 905 may be an example of aspects of a device 805 or a base station 105 as described herein. The device 905 may include a receiver 910, a communications manager 915, and a transmitter 935. The device 905 may additionally or alternatively include a processor. Each of these components may be in communication with one another (e.g., via one or more buses).

The receiver 910 may receive information such as packets, user data, or control information associated with various information channels (e.g., control channels, data channels, and information related to UE capability signaling for concurrent channel transmissions, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a capability component 920, a scheduling component 925, and a concurrent transmission component 930. The communications manager 915 may be an example of aspects of the communications manager 1110 described herein.

The capability component 920 may receive information from a UE identifying a capability of the UE to support concurrent transmissions on a maximum number of channels. The scheduling component 925 may schedule concurrent transmission by the UE on a scheduled number of channels, the scheduled number of channels exceeding the maximum number of channels supported for concurrent transmission by the UE. The concurrent transmission component 930 may receive, in response to the scheduling, one or more concurrent transmissions from the UE, the one or more concurrent transmissions being less than or equal to the maximum number of channels supported for concurrent transmission by the UE.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
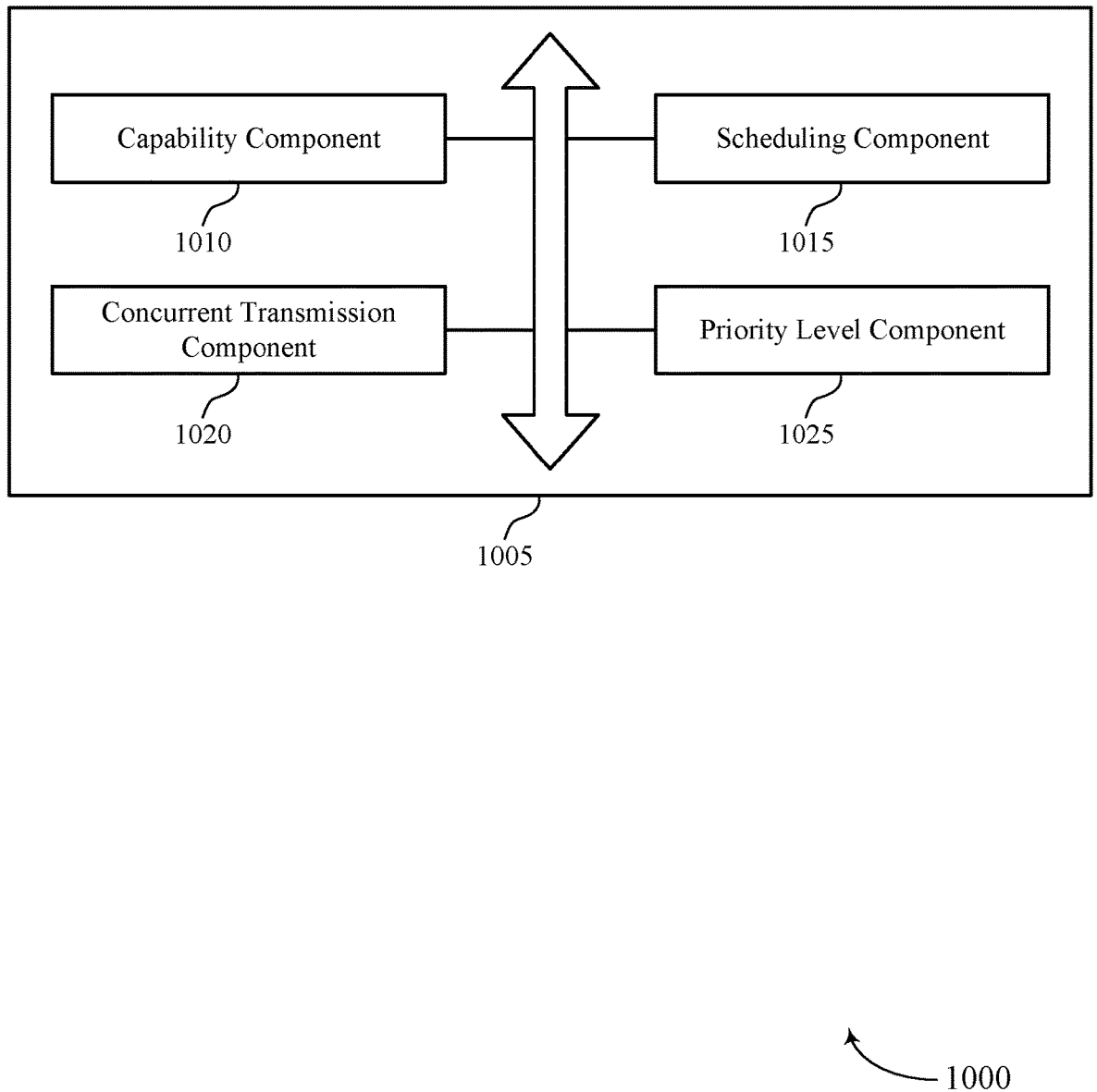
FIG. 10 shows a block diagram of a communications manager that supports UE capability signaling for concurrent channel transmissions in accordance with aspects of the present disclosure.

FIG. 10 shows a block diagram 1000 of a communications manager 1005 that supports UE capability signaling for concurrent channel transmissions in accordance with aspects of the present disclosure. The communications manager 1005 may be an example of aspects of a communications manager 815, a communications manager 915, or a communications manager 1110 described herein. The communications manager 1005 may include a capability component 1010, a scheduling component 1015, a concurrent transmission component 1020, and a priority level component 1025. Each of these modules may communicate, directly or indirectly, with one another (e.g., via one or more buses).

The capability component 1010 may receive information from a UE identifying a capability of the UE to support concurrent transmissions on a maximum number of channels. The scheduling component 1015 may schedule concurrent transmission by the UE on a scheduled number of channels, the scheduled number of channels exceeding the maximum number of channels supported for concurrent transmission by the UE.

The concurrent transmission component 1020 may receive, in response to the scheduling, one or more concurrent transmissions from the UE, the one or more concurrent transmissions being less than or equal to the maximum number of channels supported for concurrent transmission by the UE.

The priority level component 1025 may receive one or more messages via one or more of the scheduled number of channels, the scheduled number of channels being grouped into groups based on a priority level associated with each channel in the scheduled number of channels. In some cases, the priority level associated with each channel based on a payload associated with each channel, a content of each channel, a service type of each channel, or a combination thereof. In some cases, the priority level associated with each channel based on the channels being associated with either a URLLC service or an eMBB service. In some cases, each group includes one of the scheduled number of channels.

Figure 11:
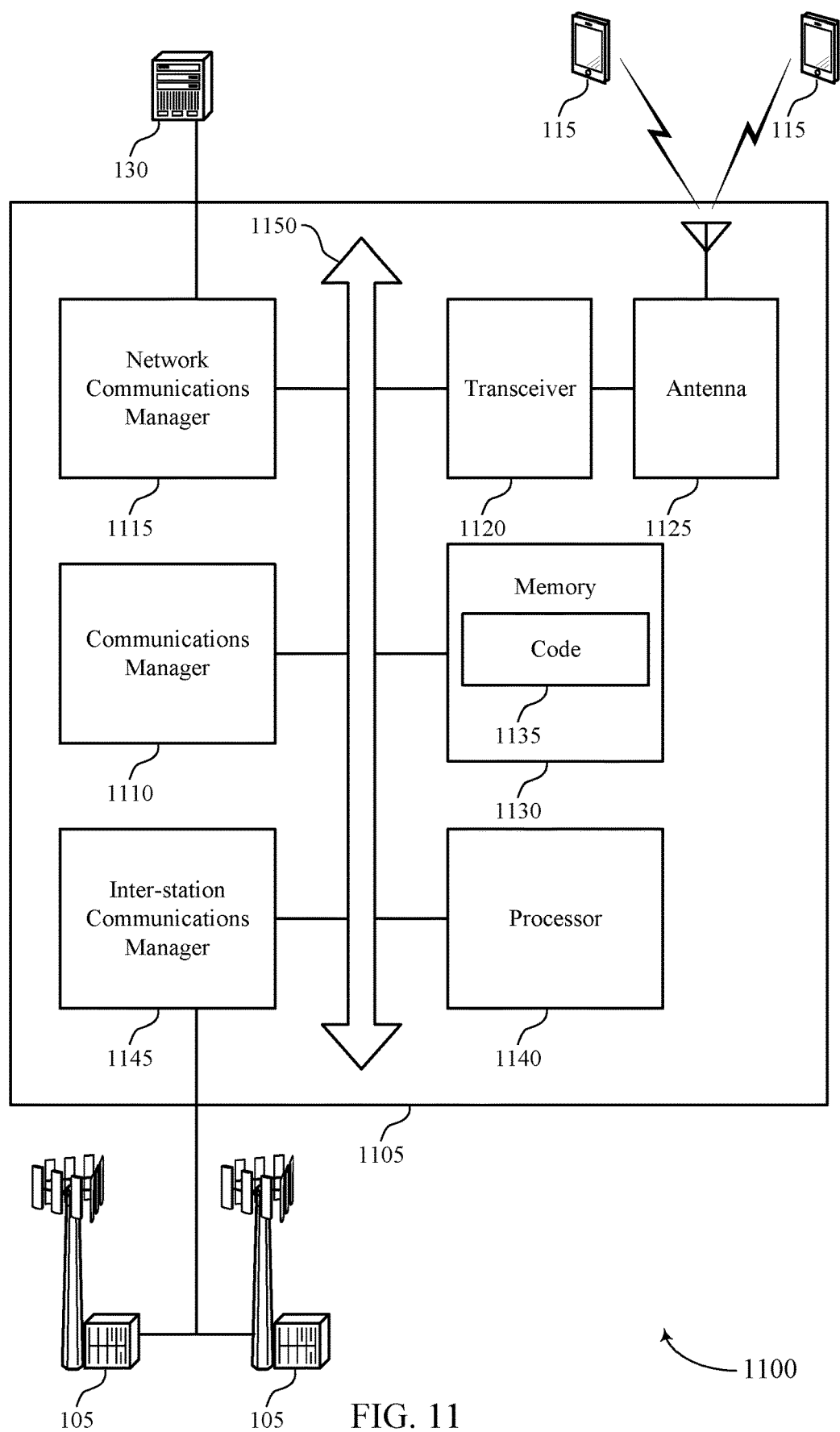
FIG. 11 shows a diagram of a system including a device that supports UE capability signaling for concurrent channel transmissions in accordance with aspects of the present disclosure.

FIG. 11 shows a diagram of a system 1100 including a device 1105 that supports UE capability signaling for concurrent channel transmissions in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive information from a UE identifying a capability of the UE to support concurrent transmissions on a maximum number of channels, schedule concurrent transmission by the UE on a scheduled number of channels, the scheduled number of channels exceeding the maximum number of channels supported for concurrent transmission by the UE, and receive, in response to the scheduling, one or more concurrent transmissions from the UE, the one or more concurrent transmissions being less than or equal to the maximum number of channels supported for concurrent transmission by the UE.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device #{device} to perform various functions (e.g., functions or tasks supporting UE capability signaling for concurrent channel transmissions).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The computer-readable code 1135 may include instructions to implement aspects of the present disclosure, including instructions to support wireless communications. The computer-readable code 1135 may be stored in a non-transitory computer-readable medium such as system memory or other type of memory. In some cases, the computer-readable code 1135 may not be directly executable by the processor 1140 but may cause a computer (e.g., when compiled and executed) to perform functions described herein.

Figure 12:
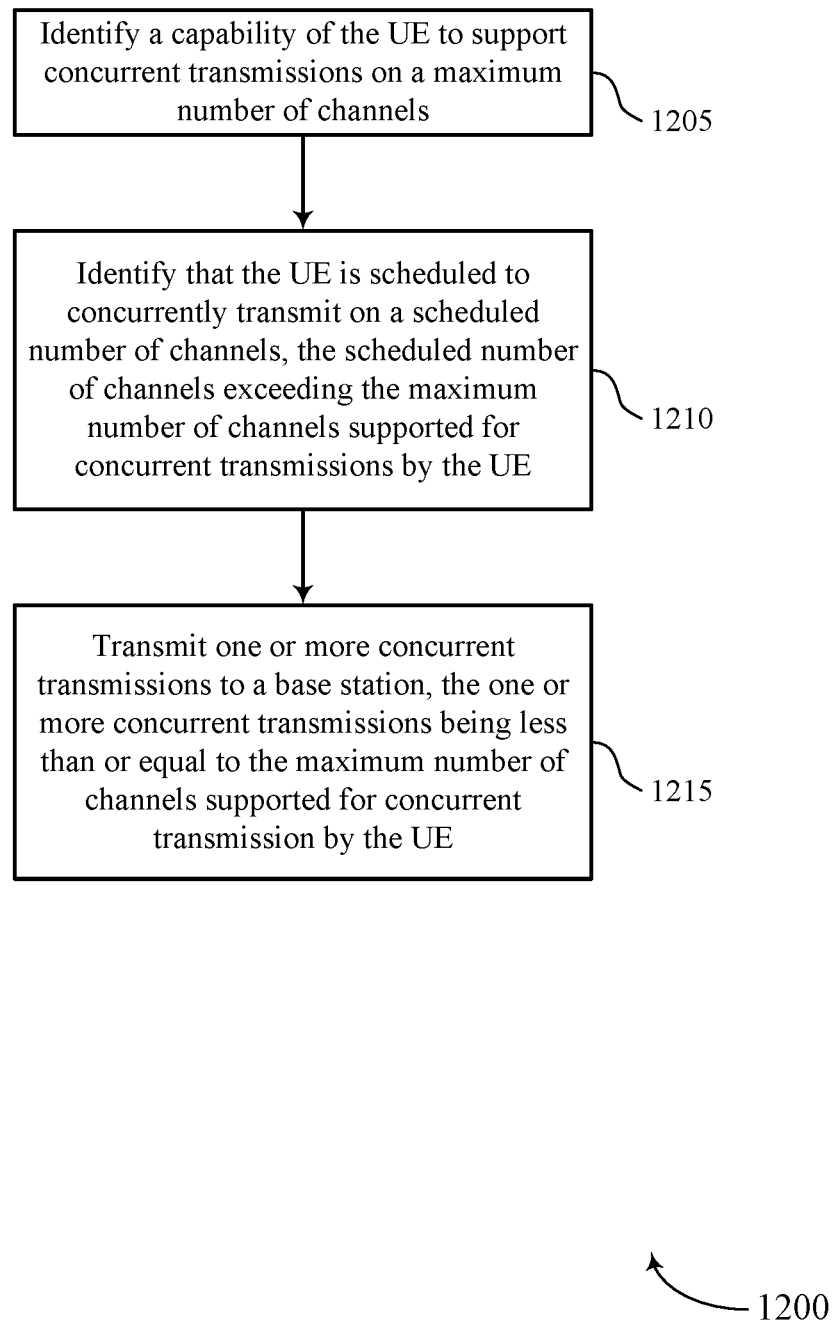
FIGS. 12 through 14 show flowcharts illustrating methods that support UE capability signaling for concurrent channel transmissions in accordance with aspects of the present disclosure.

FIG. 12 shows a flowchart illustrating a method 1200 that supports UE capability signaling for concurrent channel transmissions in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may identify a capability of the UE to support concurrent transmissions on a maximum number of channels. The operations of 1205 may be performed according to the methods described herein. In some examples, aspects of the operations of 1205 may be performed by a capability component as described with reference to FIGS. 4 through 7.

At 1210, the UE may identify that the UE is scheduled to concurrently transmit on a scheduled number of channels, the scheduled number of channels exceeding the maximum number of channels supported for concurrent transmissions by the UE. The operations of 1210 may be performed according to the methods described herein. In some examples, aspects of the operations of 1210 may be performed by a schedule component as described with reference to FIGS. 4 through 7.

At 1215, the UE may transmit one or more concurrent transmissions to a base station, the one or more concurrent transmissions being less than or equal to the maximum number of channels supported for concurrent transmission by the UE. The operations of 1215 may be performed according to the methods described herein. In some examples, aspects of the operations of 1215 may be performed by a concurrent transmission component as described with reference to FIGS. 4 through 7.

Figure 13:
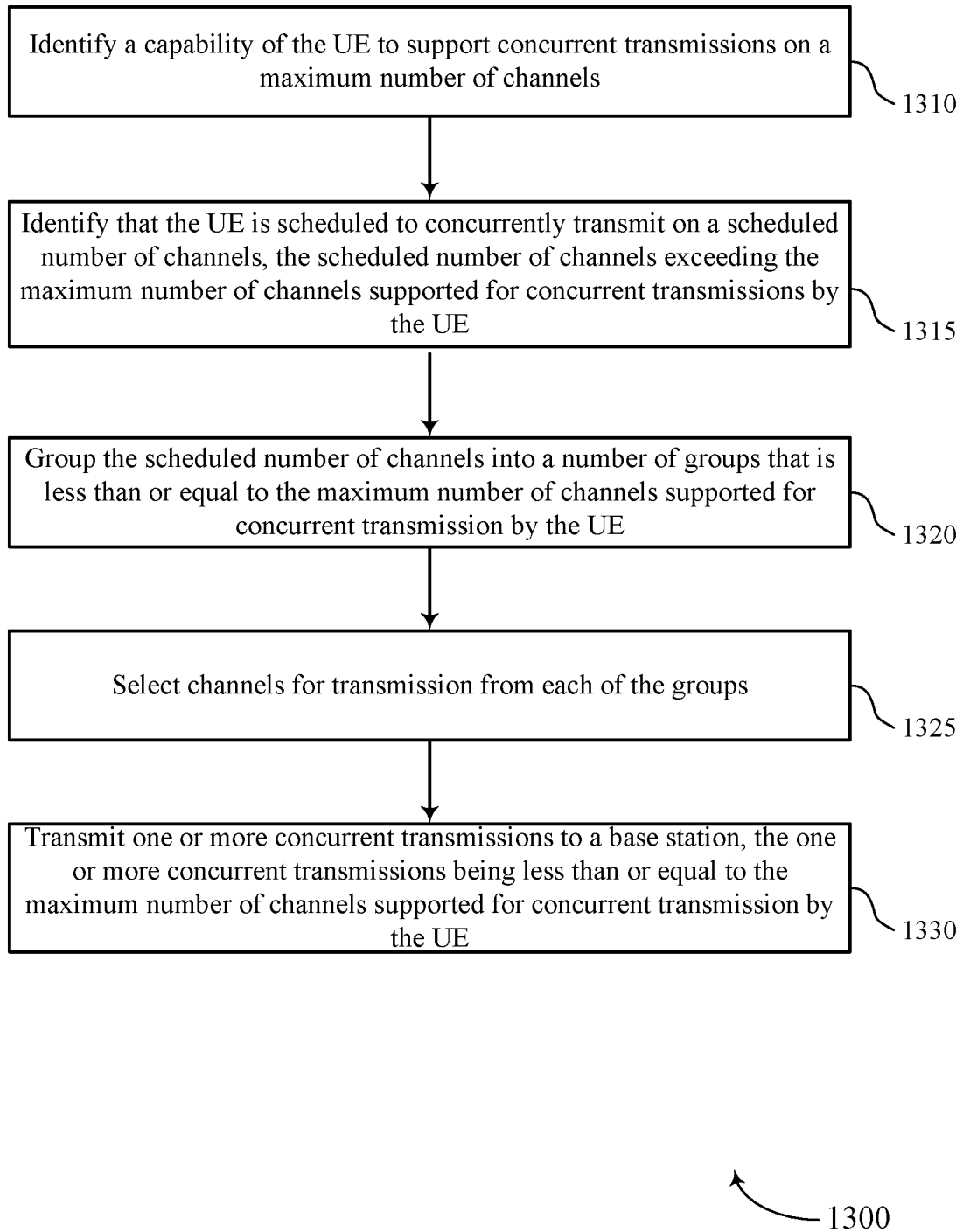

FIG. 13 shows a flowchart illustrating a method 1300 that supports UE capability signaling for concurrent channel transmissions in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1310, the UE may identify a capability of the UE to support concurrent transmissions on a maximum number of channels. The operations of 1310 may be performed according to the methods described herein. In some examples, aspects of the operations of 1310 may be performed by a capability component as described with reference to FIGS. 4 through 7.

At 1315, the UE may identify that the UE is scheduled to concurrently transmit on a scheduled number of channels, the scheduled number of channels exceeding the maximum number of channels supported for concurrent transmissions by the UE. The operations of 1315 may be performed according to the methods described herein. In some examples, aspects of the operations of 1315 may be performed by a schedule component as described with reference to FIGS. 4 through 7.

At 1320, the UE may group the scheduled number of channels into a number of groups that is less than or equal to the maximum number of channels supported for concurrent transmission by the UE. The operations of 1320 may be performed according to the methods described herein. In some examples, aspects of the operations of 1320 may be performed by a grouping component as described with reference to FIGS. 4 through 7.

At 1325, the UE may select channels for transmission from each of the groups. The operations of 1325 may be performed according to the methods described herein. In some examples, aspects of the operations of 1325 may be performed by a selection component as described with reference to FIGS. 4 through 7.

At 1330, the UE may transmit one or more concurrent transmissions to a base station, the one or more concurrent transmissions being less than or equal to the maximum number of channels supported for concurrent transmission by the UE. The operations of 1330 may be performed according to the methods described herein. In some examples, aspects of the operations of 1330 may be performed by a concurrent transmission component as described with reference to FIGS. 4 through 7.

Figure 14:
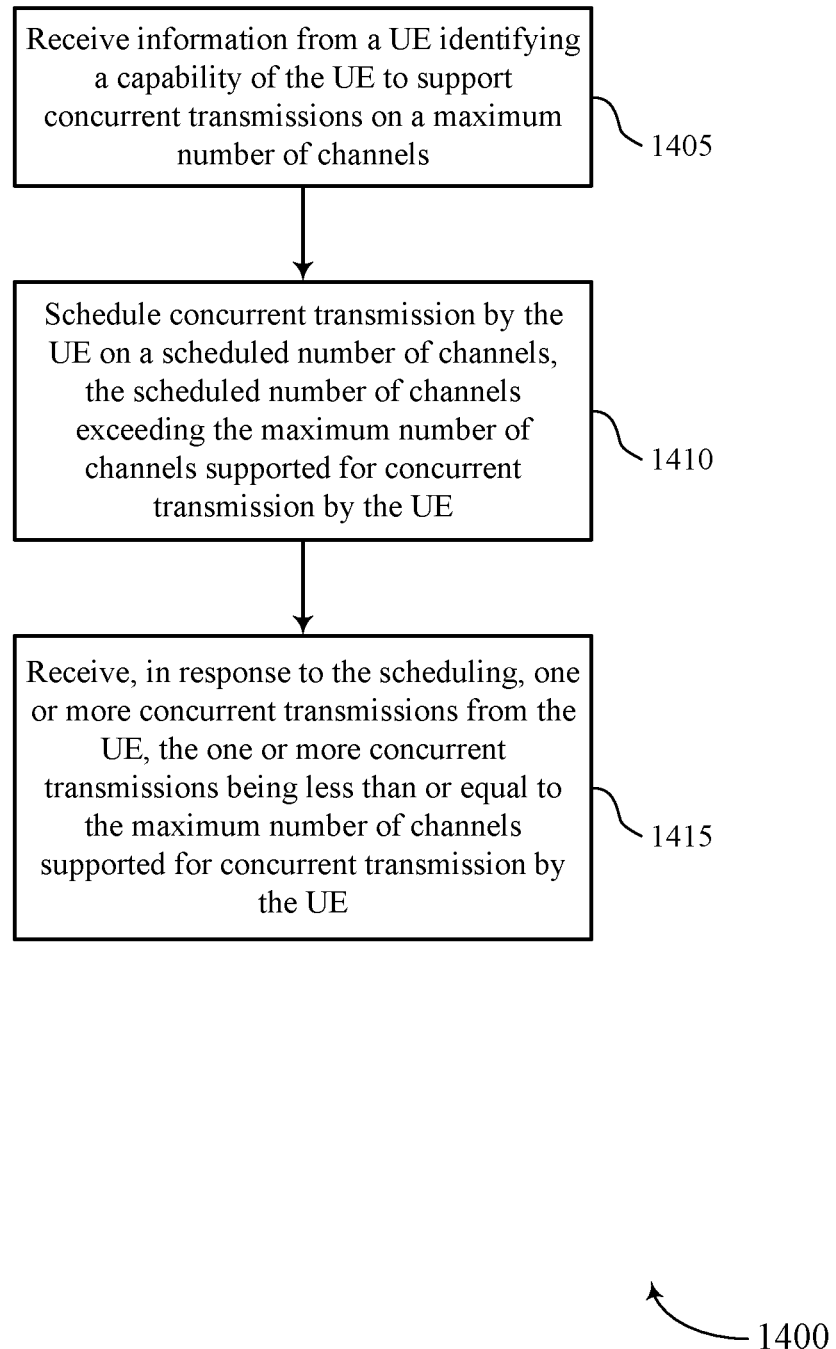

FIG. 14 shows a flowchart illustrating a method 1400 that supports UE capability signaling for concurrent channel transmissions in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may receive information from a UE identifying a capability of the UE to support concurrent transmissions on a maximum number of channels. The operations of 1405 may be performed according to the methods described herein. In some examples, aspects of the operations of 1405 may be performed by a capability component as described with reference to FIGS. 8 through 11.

At 1410, the base station may schedule concurrent transmission by the UE on a scheduled number of channels, the scheduled number of channels exceeding the maximum number of channels supported for concurrent transmission by the UE. The operations of 1410 may be performed according to the methods described herein. In some examples, aspects of the operations of 1410 may be performed by a scheduling component as described with reference to FIGS. 8 through 11.

At 1415, the base station may receive, in response to the scheduling, one or more concurrent transmissions from the UE, the one or more concurrent transmissions being less than or equal to the maximum number of channels supported for concurrent transmission by the UE. The operations of 1415 may be performed according to the methods described herein. In some examples, aspects of the operations of 1415 may be performed by a concurrent transmission component as described with reference to FIGS. 8 through 11.

It should be noted that the methods described herein describe possible examples, and that the operations and the steps may be rearranged or otherwise modified and that other examples are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency-division multiple access (OFDMA), single carrier frequency division multiple access (SC-FDMA), and other systems. A CDMA system may implement a radio technology such as CDMA2000, UTRA, etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may additionally or alternatively cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Additionally, combinations of the above may be included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a capability of the UE to support concurrent transmissions on a maximum number of channels, wherein the maximum number of channels refers to a maximum number of channels the UE supports for concurrent transmission on a same component carrier;
   identifying that the UE is scheduled to concurrently transmit on a scheduled number of channels of the same component carrier, the scheduled number of channels exceeding the maximum number of channels supported for concurrent transmissions by the UE; and
   transmitting one or more concurrent transmissions on the same component carrier to a base station, the one or more concurrent transmissions being less than or equal to the maximum number of channels supported for concurrent transmission by the UE.

2. The method of claim 1, further comprising:
   reporting, to the base station, the capability of the UE to support concurrent transmissions on the maximum number of channels.

3. The method of claim 1, further comprising:
   grouping the scheduled number of channels into a number of groups that is less than or equal to the maximum number of channels supported for concurrent transmission by the UE.

4. The method of claim 3, wherein transmitting the one or more concurrent transmissions comprises:
   selecting channels for transmission from each of the groups; and
   concurrently transmitting the selected channels such that one transmission per group is used for the concurrent transmission.

5. The method of claim 3, wherein grouping the scheduled number of channels into the number of groups comprises:
   grouping the scheduled number of channels into groups based at least in part on a priority level associated with each channel in the scheduled number of channels.

6. The method of claim 5, further comprising:
   determining the priority level associated with each channel based at least in part on a payload associated with each channel, a content of each channel, a service type of each channel, or a combination thereof.

7. The method of claim 5, further comprising:
   determining the priority level associated with each channel based at least in part on the channels being associated with either an ultra-reliable low-latency communications (URLLC) service or an enhanced mobile broadband (eMBB) service.

8. The method of claim 3, wherein grouping the scheduled number of channels into the number of groups comprises:
   grouping the scheduled number of channels into groups based at least in part on a priority level associated with each channel in the scheduled number of channels; and
   dropping groups of lower priority so that the number of groups is less than or equal to the maximum number of channels supported for concurrent transmissions by the UE.

9. The method of claim 8, wherein each group comprises one of the scheduled number of channels.

10. The method of claim 3, wherein transmitting the one or more concurrent transmissions comprises:
    multiplexing one or more of the selected channels within each group; and
    transmitting the one or more transmissions on respective multiplexed channels for each group.

11. The method of claim 3, further comprising:
    determining a highest priority channel within each group; and
    selecting channels for transmission from each of the groups, wherein the selected channels are the highest priority channels.

12. The method of claim 1, wherein transmitting the one or more concurrent transmissions comprises:
    transmitting the one or more concurrent transmissions using multiple antennas.

13. A method for wireless communication at a base station, comprising:
    receiving information from a user equipment (UE) identifying a capability of the UE to support concurrent transmissions on a maximum number of channels, wherein the maximum number of channels refers to a maximum number of channels the UE supports for concurrent transmission on a same component carrier;
    scheduling concurrent transmission by the UE on a scheduled number of channels of the same component carrier, the scheduled number of channels exceeding the maximum number of channels supported for concurrent transmission by the UE; and
    receiving, in response to the scheduling, one or more concurrent transmissions from the UE on the same component carrier, the one or more concurrent transmissions being less than or equal to the maximum number of channels supported for concurrent transmission by the UE.

14. The method of claim 13, wherein receiving, in response to the scheduling, one or more concurrent transmissions from the UE comprises:
    receiving one or more messages via one or more of the scheduled number of channels, the scheduled number of channels being grouped into groups based at least in part on a priority level associated with each channel in the scheduled number of channels.

15. The method of claim 14, wherein the priority level associated with each channel based at least in part on a payload associated with each channel, a content of each channel, a service type of each channel, or a combination thereof.

16. The method of claim 14, wherein the priority level associated with each channel based at least in part on the channels being associated with either an ultra-reliable low-latency communications (URLLC) service or an enhanced mobile broadband (eMBB) service.

17. The method of claim 14, wherein each group comprises one of the scheduled number of channels.

18. An apparatus for wireless communication at a user equipment (UE), comprising:
    a processor, memory coupled with the processor; and
    instructions stored in the memory and executable by the processor to cause the apparatus to:
    identify a capability of the UE to support concurrent transmissions on a maximum number of channels, wherein the maximum number of channels refers to a maximum number of channels the UE supports for concurrent transmission on a same component carrier;
    identify that the UE is scheduled to concurrently transmit on a scheduled number of channels of the same component carrier, the scheduled number of channels exceeding the maximum number of channels supported for concurrent transmissions by the UE; and transmit one or more concurrent transmissions on the same component carrier to a base station, the one or more concurrent transmissions being less than or equal to the maximum number of channels supported for concurrent transmission by the UE.

19. The apparatus of claim 18, wherein the instructions are further executable by the processor to cause the apparatus to:

report, to the base station, the capability of the UE to support concurrent transmissions on the maximum number of channels.

20. The apparatus of claim 18, wherein the instructions are further executable by the processor to cause the apparatus to:

group the scheduled number of channels into a number of groups that is less than or equal to the maximum number of channels supported for concurrent transmission by the UE.

21. The apparatus of claim 20, wherein the instructions to transmit the one or more concurrent transmissions are executable by the processor to cause the apparatus to:

select channels for transmission from each of the groups; and concurrently transmit the selected channels such that one transmission per group is used for the concurrent transmission.

22. The apparatus of claim 20, wherein the instructions to group the scheduled number of channels into the number of groups are executable by the processor to cause the apparatus to:

group the scheduled number of channels into groups based at least in part on a priority level associated with each channel in the scheduled number of channels.

23. The apparatus of claim 22, wherein the instructions are further executable by the processor to cause the apparatus to:

determine the priority level associated with each channel based at least in part on a payload associated with each channel, a content of each channel, a service type of each channel, or a combination thereof.

24. The apparatus of claim 22, wherein the instructions are further executable by the processor to cause the apparatus to:

determine the priority level associated with each channel based at least in part on the channels being associated with either an ultra-reliable low-latency communications (URLLC) service or an enhanced mobile broadband (eMBB) service.

25. The apparatus of claim 20, wherein the instructions to group the scheduled number of channels into the number of groups are executable by the processor to cause the apparatus to:

group the scheduled number of channels into groups based at least in part on a priority level associated with each channel in the scheduled number of channels; and drop groups of lower priority so that the number of groups is less than or equal to the maximum number of channels supported for concurrent transmissions by the UE.

26. The apparatus of claim 25, wherein each group comprises one of the scheduled number of channels.

27. The apparatus of claim 20, wherein the instructions to transmit the one or more concurrent transmissions are executable by the processor to cause the apparatus to:

multiplex one or more of the selected channels within each group; and transmit the one or more transmissions on respective multiplexed channels for each group.

28. The apparatus of claim 20, wherein the instructions are further executable by the processor to cause the apparatus to:

determine a highest priority channel within each group; and select channels for transmission from each of the groups, wherein the selected channels are the highest priority channels.

29. The apparatus of claim 18, wherein the instructions are further executable by the processor to cause the apparatus to:

transmit the one or more concurrent transmissions using multiple antennas.

30. An apparatus for wireless communication at a base station, comprising:

a processor, memory coupled with the processor; and instructions stored in the memory and executable by the processor to cause the apparatus to:

receive information from a user equipment (UE) identifying a capability of the UE to support concurrent transmissions on a maximum number of channels, wherein the maximum number of channels refers to a maximum number of channels the UE supports for concurrent transmission on a same component carrier;

schedule concurrent transmission by the UE on a scheduled number of channels of the same component carrier, the scheduled number of channels exceeding the maximum number of channels supported for concurrent transmission by the UE; and receive, in response to the scheduling, one or more concurrent transmissions from the UE on the same component carrier, the one or more concurrent transmissions being less than or equal to the maximum number of channels supported for concurrent transmission by the UE.

* * * * *